United States Patent
Heinemann

(10) Patent No.: US 7,661,772 B2
(45) Date of Patent: Feb. 16, 2010

(54) METHOD AND DEVICE FOR IMPROVING BRAKING BEHAVIOR

(75) Inventor: A. Holger Heinemann, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/294,803

(22) Filed: Nov. 14, 2002

(65) Prior Publication Data

US 2003/0111899 A1    Jun. 19, 2003

(30) Foreign Application Priority Data

Nov. 15, 2001  (DE) ................. 101 55 824
Feb. 22, 2002  (DE) ................. 102 07 378

(51) Int. Cl.
 *B60T 8/60*    (2006.01)
(52) U.S. Cl. .................. 303/146; 303/148; 303/149
(58) Field of Classification Search ........... 303/140, 303/146, 147, 148, 149, 170, DIG. 1, DIG. 2, 303/DIG. 3; 701/73, 80

See application file for complete search history.

(56) References Cited

U.S. PATENT DOCUMENTS

| | | | | |
|---|---|---|---|---|
| 3,988,043 A | * | 10/1976 | Reinecke | 303/160 |
| 5,075,859 A | * | 12/1991 | Mayr-Frohlich et al. | 701/78 |
| 5,388,896 A | * | 2/1995 | Hartmann et al. | 303/148 |
| 5,944,394 A | * | 8/1999 | Friederichs et al. | 303/148 |
| 6,044,319 A | * | 3/2000 | Rosendahl et al. | 701/71 |

FOREIGN PATENT DOCUMENTS

DE          42 25 983         2/1994

* cited by examiner

*Primary Examiner*—Bradley T King
(74) *Attorney, Agent, or Firm*—Kenyon & Kenyon LLP

(57) ABSTRACT

A method to improve the braking behavior of a vehicle is provided, in which it is not permitted to exceed a maximum allowable braking pressure difference between the braking pressures on the two wheels of one axle, and in which the maximum allowable braking pressure difference between the wheels of one axle is a function of at least one variable describing the vehicle dynamics. When an unstable behavior of the vehicle is recognized, the maximum allowable braking pressure difference between the wheels of the axle is maintained or reduced.

15 Claims, 4 Drawing Sheets

METHOD AND DEVICE FOR IMPROVING BRAKING BEHAVIOR

FIELD OF THE INVENTION

The present invention relates to a method for improving the braking behavior of a vehicle.

BACKGROUND INFORMATION

When braking on a road surface having widely different coefficients of friction with respect to the vehicle (this situation is referred to below as µ-split), it is possible that widely different braking forces may be applied in the vehicle. This results in a yaw moment about the vertical axis of the vehicle, which may result in skidding.

The driver now has the possibility to counteract the yaw moment by countersteering. Since as a rule, the yaw moment builds up very rapidly, the driver does not have enough time to react. Braking systems such as ABS (antilock braking system) or vehicle dynamics control systems such as ESP (electronic stability program) therefore limit the braking pressure on the high-µ side of the vehicle as a function of the low-µ side after the µ-split situation is recognized (the high-µ side is the side of the vehicle or of the road surface on which the higher coefficient of friction exists between the tires and road surface). This occurs based on the maximum allowable differential braking pressure.

A method for braking the wheels of a vehicle is shown in German Published Patent Application No. 42 25 983, wherein the buildup of braking pressure is influenced on at least one wheel to reduce a yaw moment produced by an ABS. In doing so, the braking pressure on the wheels of one axle is influenced such that the difference of the braking pressures of one axle does not exceed a maximum allowable value. This maximum allowable value is determined as a function of the speed of the vehicle and the transverse acceleration.

SUMMARY

The present invention is directed to a method for improving the braking behavior of a vehicle, in which it is not permitted to exceed a maximum allowable braking pressure difference between the braking pressures on the two wheels of one axle, and in which the maximum allowable braking pressure difference between the wheels of one axle being a function of at least one variable describing the vehicle dynamics.

The advantage of the present invention is that when an unstable behavior of the vehicle is recognized, the maximum allowable braking pressure difference between the same wheels is maintained or reduced.

In a braking operation on a µ-split road surface, there is a conflict of objectives between driving stability of the vehicle and a short braking distance.

Driving stability is attained by keeping the allowable differential pressure low as a result of which the braking forces applied to the wheels of an axle stay nearly the same. However, the result of this is that the braking distance is lengthened since the maximum possible braking forces are not applied. However, for an optimum braking distance, the differential pressure should not be limited so that the maximum possible braking force may be set on each wheel. In µ-split braking, however, this results in a yaw moment about the vertical axis, which may result in skidding. By maintaining and/or reducing the maximum allowable braking pressure difference between the wheels of an axle when a slightly unstable behavior of the vehicle is recognized (in particular if there is still no skidding), it is possible to restabilize the vehicle.

An advantageous embodiment is characterized by reducing the maximum allowable braking pressure difference only if having previously maintained the maximum allowable braking pressure difference did not result in stabilizing the vehicle. Maintaining the maximum allowable braking pressure is intended to give the driver time to countersteer. Only if this measure is inadequate or comes too late is the maximum allowable braking pressure difference reduced.

In this connection, it is of advantage if when a first stage of unstable behavior is recognized, the maximum allowable braking pressure difference is maintained, and when a second stage of unstable behavior is recognized, the maximum allowable braking pressure is reduced.

The first stage of unstable behavior is recognized by an analysis of the deviation of the actual yaw rate of the vehicle from the desired yaw rate of the vehicle, and the second stage of unstable behavior is recognized by an analysis of the yaw acceleration.

The variables "actual yaw rate" and "desired yaw rate" are available in a vehicle equipped with a vehicle dynamics control system so that no significant additional expense is required for the present invention. The difference between these two yaw rates represents an indicator of an unstable state of vehicle dynamics. The yaw acceleration may be obtained from the yaw speed (or yaw rate, the terms "yaw speed" and "yaw rate" describe the same thing) by simple time differentiation. The yaw acceleration may be selected because it may be considered an indicator for an instability in a µ-split braking. The relationship between yaw acceleration and yaw moment is essentially given by Newton's law of motion.

In an exemplary embodiment of the invention, if the absolute value of the deviation between the actual yaw rate determined for the vehicle and the desired yaw rate exceeds a specifiable threshold value, a first stage of unstable behavior is recognized. A check based on a threshold value is in particular simple to implement.

Furthermore, if the steering angle exceeds a specifiable threshold value, the first stage of unstable behavior is recognized. This is related to the fact that the yaw moment should not be increased further if considerable steering has already been performed. This prevents the vehicle from suddenly turning in the other direction if the friction characteristics between the road surface and the tires change.

In an exemplary embodiment, the second stage of unstable behavior is recognized if at least the yaw acceleration exceeds a specifiable threshold, and the difference between the braking pressures on the two wheels of one axle exceeds a specifiable threshold value, and the transverse acceleration of the vehicle remains below a specifiable threshold value.

These three conditions represent necessary conditions for the presence of the second stage of unstable behavior. In order to avoid an incorrect activation of the logic, the differential pressure may only be adapted if the transverse acceleration (ay) is lower than a limit value.

Furthermore, the second stage of unstable behavior may be recognized if at least the yaw acceleration exceeds a specifiable threshold value, and the braking pressure difference between the braking pressures on the two wheels of one axle exceeds a specifiable threshold value, and the transverse acceleration of the vehicle remains below a specifiable threshold value and a rotation of the vehicle about its vertical axis to the side to which the higher braking pressure is applied is detected.

It is thus determined if the rotation of the vehicle is at all attributable to the braking pressure difference.

It is also possible that the second stage of unstable behavior is recognized if at least the yaw acceleration exceeds a specifiable threshold value, and the braking pressure difference between the braking pressures on the two wheels of one axle exceeds a specifiable threshold value, and the transverse acceleration of the vehicle remains below a specifiable threshold value, and a rotation of the vehicle about its vertical axis to the side to which the higher braking pressure is applied is detected, and the presence of a braking operation on a µ-split road surface is recognized.

The device of the present invention for improving the braking behavior of a vehicle contains an arrangement for controlling the braking pressure whereby it is ensured that a maximum allowable braking pressure difference between the braking pressures on the two wheels of an axle may not be exceeded, the maximum allowable braking pressure difference between the wheels of an axle being a function of at least one variable describing the vehicle dynamics, and is characterized in that the arrangement to control the braking pressure maintain or reduce the maximum allowable braking pressure difference between the wheels of an axle if an unstable behavior is recognized.

DETAILED DESCRIPTION

In a braking operation on a µ-split road surface, there is a conflict of objectives between driving stability of the vehicle and a short braking distance. Driving stability is attained by keeping the allowable differential pressure low as a result of which the braking forces applied to the wheels of one axle stay nearly the same. However, the result of this is that the braking distance is lengthened since the maximum possible braking forces are not applied. However, for an optimum braking distance, the differential pressure should not be limited so that the maximum possible braking force may be set on each wheel. In µ-split braking, however, this results in a yaw moment about the vertical axis, which may result in skidding.

Figure 1:
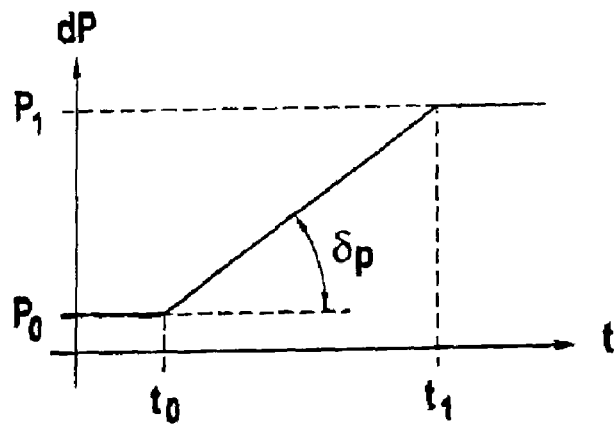
FIG. 1 is a graph illustrating a principle of a controlled increase of differential pressure.

The basic procedure for controlling and/or regulating the differential pressure is illustrated in FIG. 1. In it time t is plotted in the direction of the x-axis, the maximum allowable differential pressure dP is plotted in the direction of the y-axis.

In other systems, after µ-split braking is recognized (point in time $t_0$ in FIG. 1), the allowable differential pressure is limited to a small starting value (FIG. 1: $P_0$). This value is then increased to a maximum value (FIG. 1: $P_1$) as a function of time. Maximum value $P_1$ may possibly also be speed dependent. This limited pressure buildup on the high-µ wheel gives the driver enough time to reduce the yaw moment by countersteering.

The system may be tuned such that even an inexperienced driver or a driver who has been surprised by a sudden µ-split situation does not begin to skid. Therefore a small pressure increase gradient δp (see FIG. 1) may be selected.

In contrast to this, the present invention takes the behavior of the vehicle into account. The controlled differential pressure increase is based on a regulation which influences the allowable differential pressure as a function of the yaw acceleration, the system deviation of the yaw speed (yaw rate) and of the steering angle. The result is a better compromise between braking distance and driving stability for most driving situations.

The great advantage of the present invention is that pressure increase gradient δp may be selected to be lower so that the braking distance is shortened. Should, however, the yaw moment about the vertical axis of the vehicle become too high, the present invention prevents the vehicle from starting to skid. The braking behavior of a vehicle is thus improved by the vehicle behavior influencing the maximum allowable braking pressure difference or braking force difference between the two wheels of an axle.

For a good compromise between braking distance and driving stability, it is critical to find an optimum differential pressure increase gradient. This is, however, a function of the road surface conditions and driver responses. The present invention includes a regulation based on brake control or brake regulation, which in turn is made up of two parts: a) a precontrol which prevents a further increase of the pressure difference and b) a regulation which is capable of reducing the pressure difference.

Precontrol (First Phase):

The precontrol is activated when a first stage of unstable behavior is recognized. In vehicle dynamics control systems, a desired yaw speed (vGiAck) is generally first determined from steering angle Lw and vehicle speed (vx) using characteristic speed vch (this is a vehicle constant). Using transverse vehicle acceleration (ay), longitudinal vehicle acceleration (vx), and additional auxiliary variables if necessary, desired yaw speed (vGiSo) is determined therefrom.

Yaw speed deviation evGi is determinable from the difference:

$$evGi = vGiSo - vg1 \tag{1}$$

If evGi becomes too great in a µ-split braking operation, this is an indication that the vehicle is becoming unstable. As a rule, the driver has not been able to reduce the yaw moment by countersteering. The yaw moment may not increase further in order to give the driver time to countersteer. The pressure increase gradient must therefore be set to zero for a specific period of time. Subsequently, the yaw moment should not increase further if considerable steering has already been performed so that the vehicle does not suddenly lurch in the other direction if the coefficient of friction circumstances change.

Figure 2:
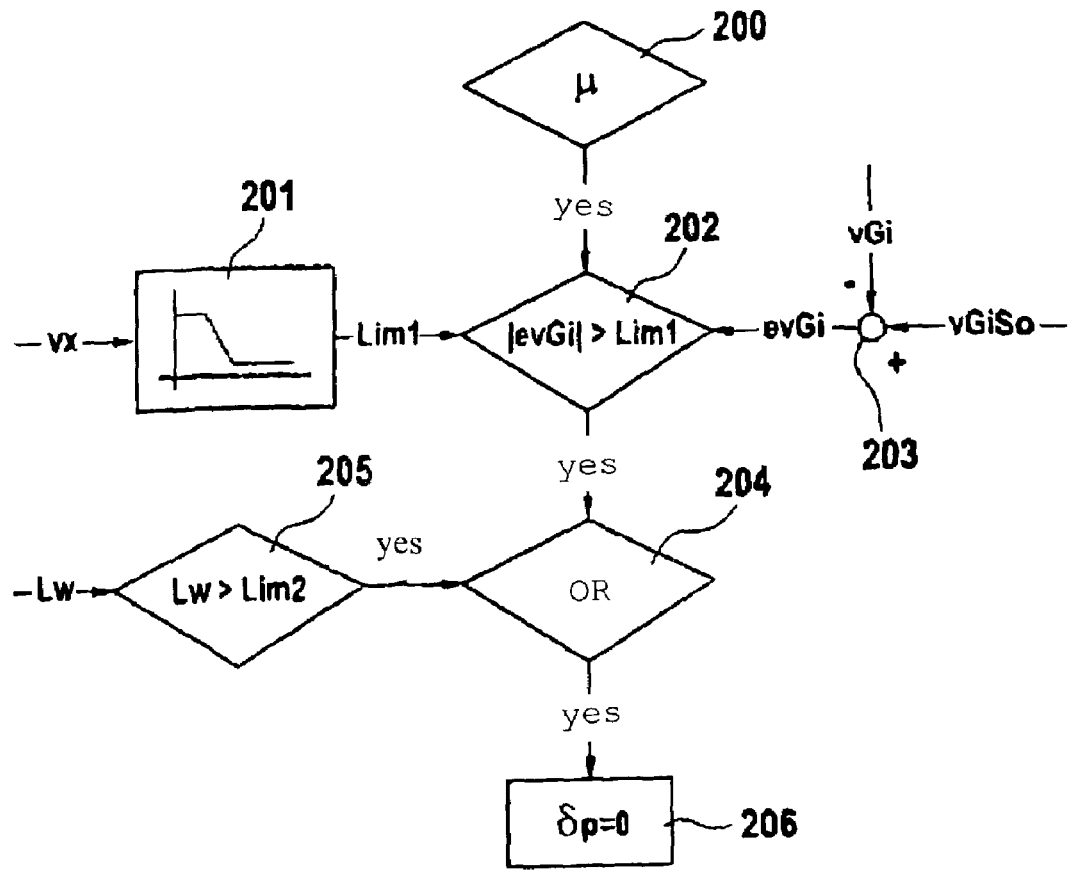
FIG. 2 is a flowchart of a first phase of the differential pressure control.

This situation is illustrated in a block diagram in FIG. 2. For the sake of clarity, only the "yes" outputs are drawn in the blocks in FIG. 2. Of course, blocks 200, 202, 204 and 205 also have "no" outputs. If one of the conditions checked in these blocks is not fulfilled (i.e., the "no" output is activated), then the sequence is interrupted or branched back to block 200, i.e., the sequence starts anew.

In block 200, it is checked whether µ-split braking is present; this is denoted by the symbol "µ" in block 200.

If µ-split braking is present, it is checked in block 202 whether the amount of the deviation |evGi| of the yaw speed exceeds a specific threshold value (Lim1). Threshold value Lim1 is determined as a function of longitudinal vehicle acceleration vx. Lim 1 is determined in block 201. For this purpose, longitudinal vehicle acceleration vx is used as an input variable for block 201. Deviation evGi is determined in subtraction block 203: evGi=vGiSo−vGi.

As another condition, it is checked in block 205 whether steering angle Lw exceeds a specifiable threshold value Lim2: Lw>Lim2. For this purpose, block 205 receives the steering angle as an input signal (from a steering angle sensor, for example).

The output signals of comparison blocks 202 (|evGi|>Lim1?) and 205 (Lw>Lim2?) are fed to block 204.

If at least one of the conditions is fulfilled, i.e.,

|evGi|>Lim1 OR Lw>Lim2, then in block 205 the differential pressure gradient δp (see FIG. 1) is set to zero; otherwise it stays at the original value. If the deviation again remains below threshold value Lim1 and the steering angle again remains below threshold value Lim2, the differential pressure may increase again.

Regulation (Second Phase):

The regulation is activated if a second stage of unstable behavior is recognized. Should the described precontrol be insufficient or comes too late, the yaw moment must be reduced actively, i.e., without any action by the driver. Yaw acceleration DvGi may be considered an indicator of an excessively high yaw moment. This is calculated using time differentiation of the yaw speed:

$$DvGi=d(VGi)/dt$$

The differential pressure should only be reduced if the vehicle rotates too rapidly to the high-μ side in μ-split braking. To avoid an incorrect activation of the logic, the differential pressure may only be adapted if transverse vehicle acceleration (ay) is less than a limit value (Lim3).

The braking pressure on the front wheels is used to reliably recognize the high-μ side in μ-split braking:

For example, the high-μ side may be the left side of the vehicle. On the high-μ side, braking pressure pvL (pVL=braking pressure of the left front wheel) is higher by a specific amount (Off1) than braking pressure pvR of the other side (pVR=braking pressure of the right front wheel). If the vehicle rotates simultaneously in this direction (DvGi>Lim4), allowable differential pressure dP is adjusted according to the following regulating equation:

$$dP=dP-C^*|DvGi|$$

C is a constant that may be applied as a function of the vehicle.

The reduction lowers the braking pressure in the high-μ wheel and, as a consequence, the yaw moment about the vertical axis is reduced. After the vehicle has become stabilized, the differential pressure may be increased again.

Figure 3:
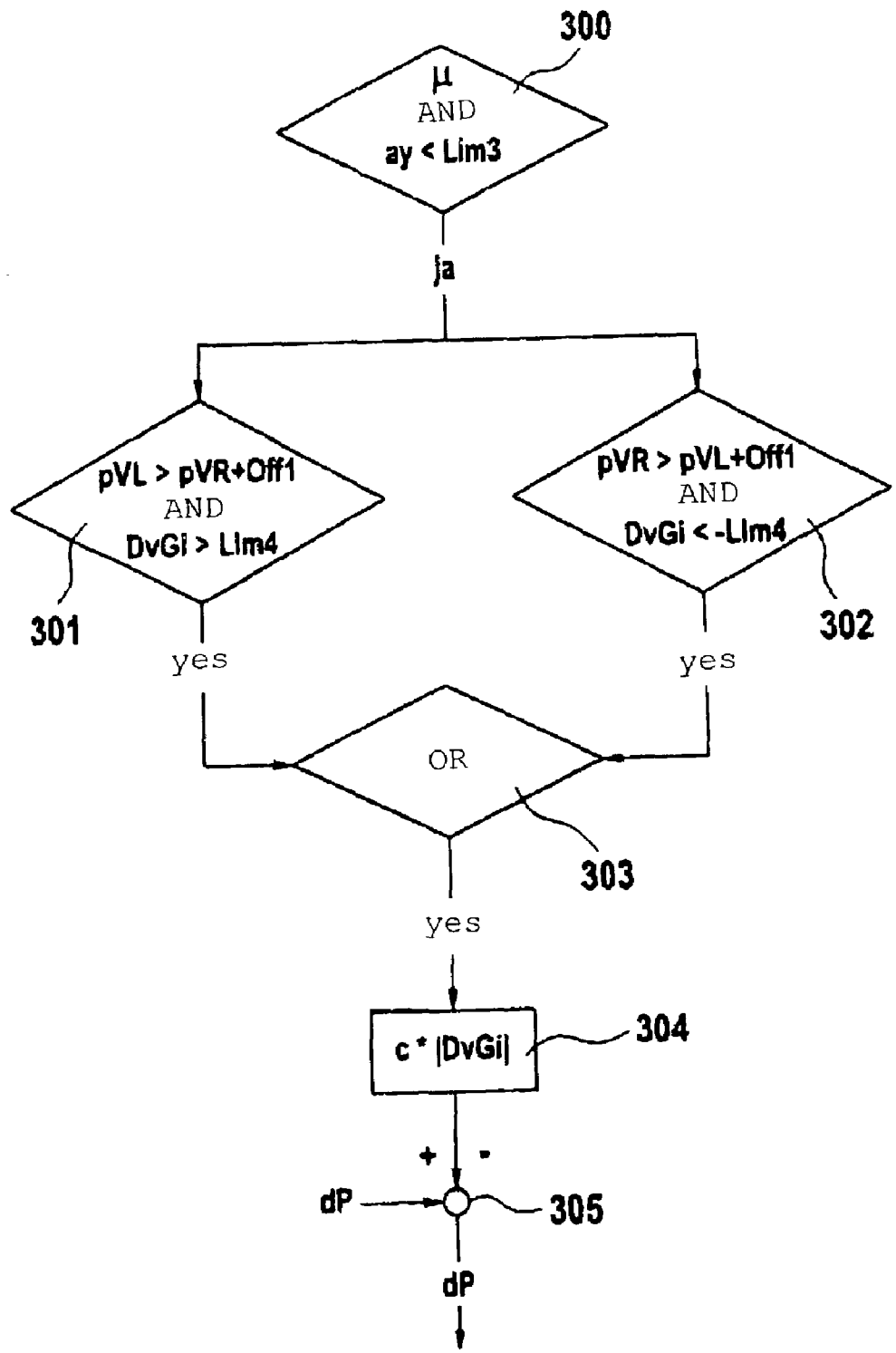
FIG. 3 is a flowchart of a second phase of the differential pressure control.

The regulation is described with reference to a block diagram (FIG. 3):

In query block 300, it is determined whether μ-split braking is present (denoted by the symbol "μ" in block 300) and whether transverse vehicle acceleration (ay) simultaneously remains below a threshold value Lim3. If this is the case, two queries are made simultaneously:

query 1 takes place in block 301. A check is made there whether braking pressure pvL of the left front wheel exceeds braking pressure pvR of the right front wheel by more than value Off1 (pvL>pvR=Off1) and whether DvGi>Lim4 at the same time.

query 2 takes place in block 302. A check is made there whether braking pressure pvR of the right front wheel exceeds braking pressure pvL of the left front wheel by more than value Off1 (pvR>pvL=Off1) and whether DvGi<Lim4 at the same time.

These two queries include both possible equivalent cases as to whether a yaw moment is occurring to the right or left about the vertical axis of the vehicle. Each "yes" output of the two gating queries 301 and 302 is fed to OR query 303. If one of the two conditions 301 and 302 is fulfilled, then OR query 303 is fulfilled at the same time. The "yes" output of OR query 303 is therefore fed to block 304. In block 304, product C*|DvGi| is formed. The result of this block is fed to gating block 305. At the same time the maximum allowable pressure difference (differential pressure) dP is fed to block 305. From these two variables (namely variable C*|DvGi| and (old) variable dp), the new variable $$dP=dP-C^*|DvGi|$$

is formed, i.e., dP is reduced by value C*|DvGi|. New variable dP is on the left side of the equation; old variable dP is on the right side of the equation, i.e., the equation is to be understood as an iteration method.

Figure 4:
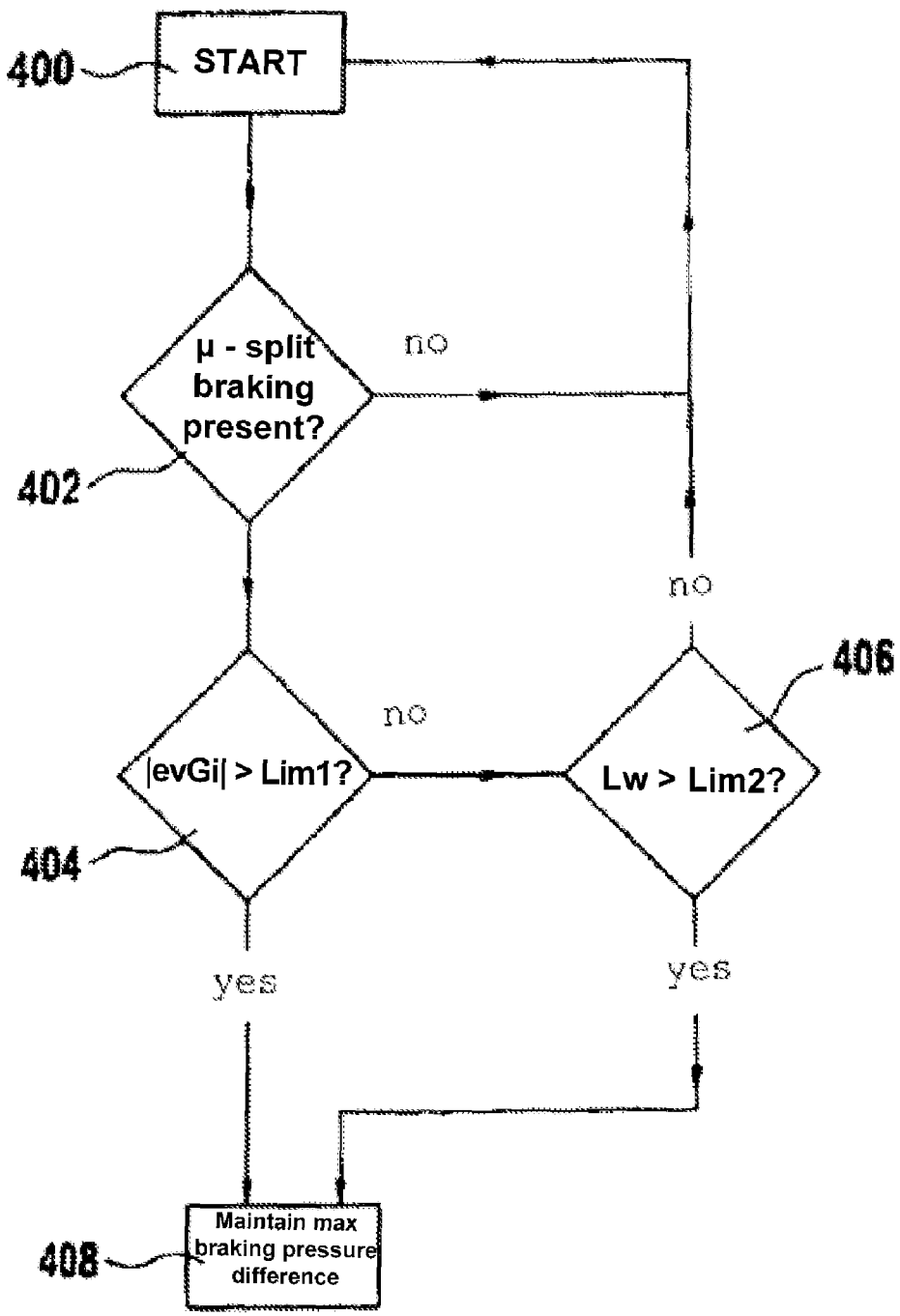
FIG. 4 is a flowchart of the first phase of the differential pressure control, illustrating the control of the maximum allowable pressure difference.

The control of the maximum allowable pressure difference is illustrated in FIG. 4 in the form of a flow diagram. After the start in block 400, it is checked in block 402 whether μ-split braking is present. If this is not the case, then branching occurs back to block 400. If it is the case, then it is checked in block 404 whether condition |evGi|>Lim1 is fulfilled. If this condition is not fulfilled, then it is checked in block 406 whether Lw>Lim2 is fulfilled. If condition 404 is fulfilled, branching also takes place to block 408. If condition 406 is not fulfilled, branching occurs back to block 400. In block 408, the maximum allowable braking pressure difference is maintained, i.e., δp=0.

Figure 5:
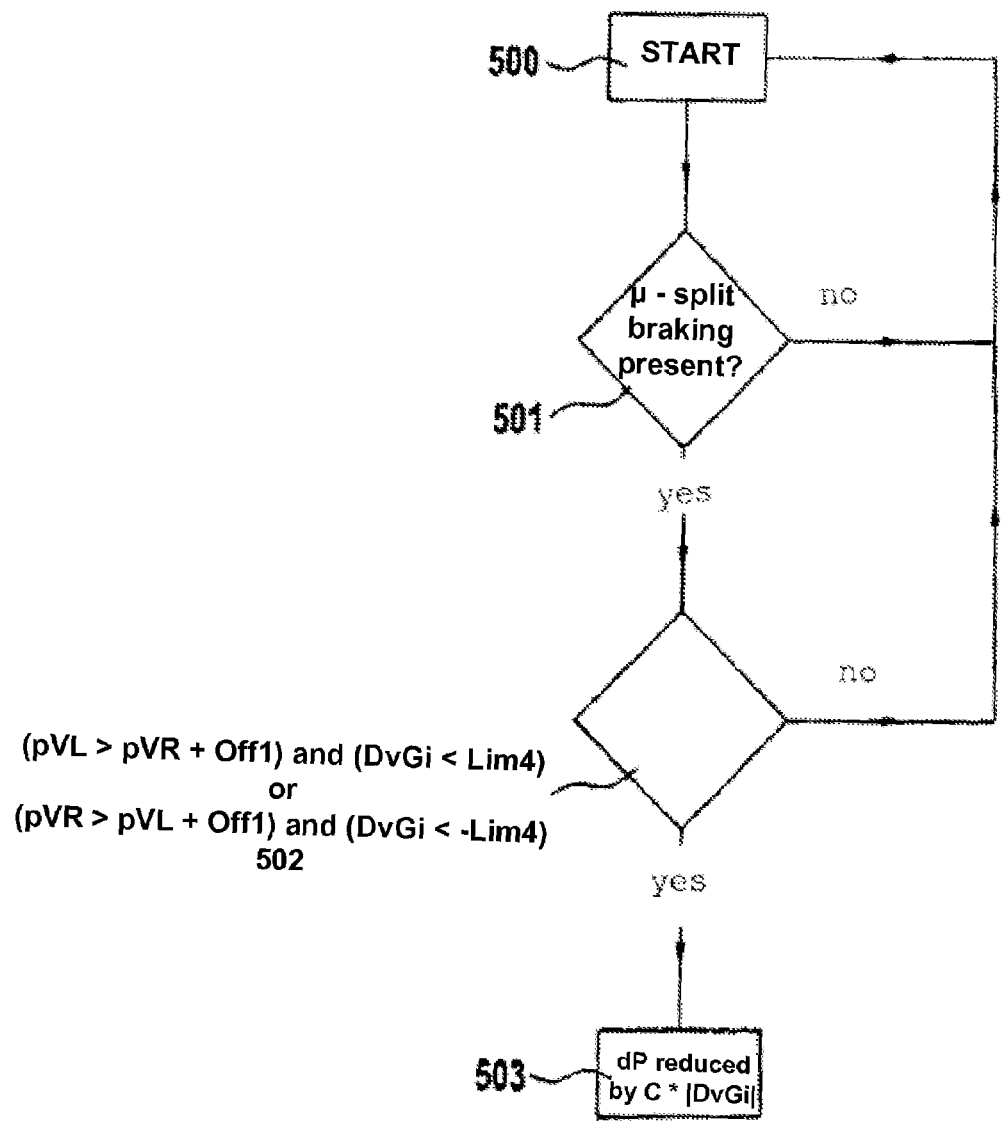
FIG. 5 is a flowchart of the second phase of the differential pressure control, illustrating the control of the maximum allowable pressure difference.

The method for regulating the maximum allowable pressure difference is illustrated in FIG. 5 in the form of a flow diagram. After the start in block 500, it is checked in block 501 whether μ-split braking is present and whether ay<Lim3 at the same time. If this condition is not fulfilled, branching occurs back to block 500. If both conditions are fulfilled in block 501, then it is checked in block 502 whether (pVL>pVR+Off1) and (DvGi<Lim4) are fulfilled simultaneously or whether (pVR>pVL+Off1) and (DvGi<−Lim4) are fulfilled simultaneously. If this is not the case, i.e., neither condition is fulfilled, then branching occurs back to block 500. If, however, the query in block 502 is fulfilled, then variable C*|DvGi| is formed in block 503 and maximum allowable pressure difference dP is reduced by this value.

The abbreviations used in the description are listed once more below:

| | |
|---|---|
| ay | transverse vehicle acceleration |
| dP | maximum allowable pressure difference |
| DvGi | yaw acceleration |
| evGi | yaw rate deviation |
| high-μ side | side of the vehicle with a high coefficient of friction (of the road surface) |
| low-μ side | side of the vehicle with a low coefficient of friction (of the road surface) |
| Lw | steering angle |
| P0, P1 | braking pressures |
| PVL, pVR | wheel braking pressure, left front, left right |
| t | time |
| vch | characteristic speed (constant) |
| vGi | yaw rate |

-continued

| | |
|---|---|
| vGiAck | desired raw value for yaw rate |
| VgiSo | desired yaw rate |
| vx | longitudinal vehicle acceleration |
| δp | pressure increase gradient |

What is claimed is:

1. A method of improving a braking behavior of a vehicle, comprising:
preventing exceeding of a maximum allowable braking pressure difference between braking pressures on two wheels of one axle, wherein the maximum allowable braking pressure difference is a function of at least one variable describing vehicle dynamics; and
one of maintaining and reducing the maximum allowable braking pressure difference if an unstable behavior of the vehicle is recognized, wherein, upon recognizing a first stage of the unstable behavior, the maximum allowable braking pressure difference is maintained, and wherein, upon recognizing a second stage of the unstable behavior, the maximum allowable braking pressure is reduced.

2. The method according to claim 1, wherein the maximum allowable braking pressure difference is reduced only if maintaining the maximum allowable braking pressure difference previously did not result in stabilizing of the vehicle.

3. The method according to claim 1, wherein the first stage of unstable behavior is recognized by an analysis of a difference between an actual yaw rate of the vehicle and a desired yaw rate of the vehicle, and wherein the second stage of the unstable behavior is recognized by an analysis of a yaw acceleration.

4. The method according to claim 1, wherein the first stage of the unstable behavior is recognized if an amount of deviation of an actual yaw rate determined for the vehicle from a desired yaw rate exceeds a threshold value.

5. The method according to claim 1, wherein the first stage of the unstable behavior is recognized if a steering angle exceeds a threshold value.

6. The method according to claim 1, wherein the second stage of the unstable behavior is recognized if at least a yaw acceleration exceeds a first threshold value, a braking pressure difference between braking pressures on the two wheels of the one axle exceeds a second threshold value, and a transverse acceleration of the vehicle remains below a third threshold value.

7. The method according to claim 1, wherein the second stage of the unstable behavior is recognized if at least a yaw acceleration exceeds a first threshold value, a braking pressure difference between braking pressures on the two wheels of the one axle exceeds a second threshold value, a transverse acceleration of the vehicle remains below a third threshold value, and a rotation of the vehicle about a vertical axis to a side of the vehicle on which a higher braking pressure is applied is detected.

8. The method according to claim 1, wherein the second stage of the unstable behavior is recognized if at least a yaw acceleration exceeds a first threshold value, a braking pressure difference between braking pressures on the two wheels of the one axle exceeds a second threshold value, a transverse acceleration of the vehicle remains below a third threshold value, a rotation of the vehicle about a vertical axis to a side of the vehicle on which a higher braking pressure is applied is detected, and a presence of a braking operation on a μ-split road surface is recognized.

9. A system for improving a braking behavior of a vehicle, comprising:
an arrangement for controlling a maximum allowable braking pressure difference between braking pressures on two wheels of one axle as a function of at least one variable describing vehicle dynamics, wherein the arrangement for controlling the maximum allowable braking pressure difference one of maintains and reduces the maximum allowable braking pressure difference if an unstable behavior of the vehicle is recognized, such that, upon recognizing a first stage of the unstable behavior, the maximum allowable braking pressure difference is maintained, and wherein, upon recognizing a second stage of the unstable behavior, the maximum allowable braking pressure is reduced.

10. The method according to claim 9, wherein the first stage of unstable behavior is recognized by an analysis of a difference between an actual yaw rate of the vehicle and a desired yaw rate of the vehicle, and wherein the second stage of the unstable behavior is recognized by an analysis of a yaw acceleration.

11. The method according to claim 9, wherein the first stage of the unstable behavior is recognized if an amount of deviation of an actual yaw rate determined for the vehicle from a desired yaw rate exceeds a threshold value.

12. The method according to claim 9, wherein the first stage of the unstable behavior is recognized if a steering angle exceeds a threshold value.

13. The method according to claim 9, wherein the second stage of the unstable behavior is recognized if at least a yaw acceleration exceeds a first threshold value, a braking pressure difference between braking pressures on the two wheels of the one axle exceeds a second threshold value, and a transverse acceleration of the vehicle remains below a third threshold value.

14. The method according to claim 9, wherein the second stage of the unstable behavior is recognized if at least a yaw acceleration exceeds a first threshold value, a braking pressure difference between braking pressures on the two wheels of the one axle exceeds a second threshold value, a transverse acceleration of the vehicle remains below a third threshold value, and a rotation of the vehicle about a vertical axis to a side of the vehicle on which a higher braking pressure is applied is detected.

15. The method according to claim 9, wherein the second stage of the unstable behavior is recognized if at least a yaw acceleration exceeds a first threshold value, a braking pressure difference between braking pressures on the two wheels of the one axle exceeds a second threshold value, a transverse acceleration of the vehicle remains below a third threshold value, a rotation of the vehicle about a vertical axis to a side of the vehicle on which a higher braking pressure is applied is detected, and a presence of a braking operation on a μ-split road surface is recognized.

* * * * *

UNITED STATES PATENT AND TRADEMARK OFFICE
CERTIFICATE OF CORRECTION

PATENT NO. : 7,661,772 B2
APPLICATION NO. : 10/294803
DATED : February 16, 2010
INVENTOR(S) : A. Holger Heinemann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this

Thirtieth Day of November, 2010

David J. Kappos
*Director of the United States Patent and Trademark Office*